(12) United States Patent
Dutta et al.

(10) Patent No.: US 9,110,763 B2
(45) Date of Patent: Aug. 18, 2015

(54) HIGHLIGHTING CHANGES ON COMPUTER DIAGRAMS

(75) Inventors: Suhail Dutta, Kirkland, WA (US); Andrew J. Byrne, Redmond, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 1096 days.

(21) Appl. No.: 12/648,304

(22) Filed: Dec. 29, 2009

(65) Prior Publication Data

US 2011/0161846 A1     Jun. 30, 2011

(51) Int. Cl.
*G06F 3/0481*     (2013.01)
*G06F 9/44*     (2006.01)

(52) U.S. Cl.
CPC ...................... *G06F 8/70* (2013.01)

(58) Field of Classification Search
CPC ........ G06Q 10/06; G06F 8/70; G06F 17/5009
USPC ........................................................ 715/772
See application file for complete search history.

(56) References Cited

U.S. PATENT DOCUMENTS

| | | | |
|---|---|---|---|
| 7,103,434 B2 | 9/2006 | Chernyak et al. | |
| 7,139,999 B2 | 11/2006 | Bowman-Amuah | |
| 7,254,593 B2 | 8/2007 | Albornoz et al. | |
| 7,337,388 B2 | 2/2008 | Barnett et al. | |
| 7,401,291 B2 | 7/2008 | Ramaley et al. | |
| 7,756,914 B2 * | 7/2010 | Allen et al. | 707/822 |
| 7,895,552 B1 * | 2/2011 | Singhal et al. | 716/106 |
| 8,056,049 B2 * | 11/2011 | Bai et al. | 717/105 |
| 2006/0236246 A1 | 10/2006 | Bono et al. | |
| 2009/0043824 A1 | 2/2009 | Claghorn | |
| 2009/0235364 A1 | 9/2009 | Cohen et al. | |
| 2010/0313179 A1 * | 12/2010 | Groves et al. | 717/101 |
| 2014/0288892 A1 * | 9/2014 | Reghetti et al. | 703/1 |

OTHER PUBLICATIONS

Mehra, et al., "A Generic Approach to Supporting Diagram Differencing and Merging for Collaborative Design", Retrieved at <<http://citeseerx.ist.psu.edu/viewdoc/download?doi=10.1.1.78.506&rep=rep1&type=pdf>> In the proceedings of the 2005 ACM/IEEE International Conference on Automated Software Engineering, Nov. 7-11, 2005, pp. 10.

Abi-Antoun, et al., "Differencing and Merging of Architectural Views", Retrieved at <<http://citeseerx.ist.psu.edu/viewdoc/download;jsessionid=C07DF58B10FCA89486D99A443DA1B-263?doi=10.1.1.61.1943&rep=rep1&type=pdf>> In the proceedings of the 21st IEEE/ACM International Conference on Automated Software Engineering Sep. 18-22, 2006, pp. 1-10.

(Continued)

*Primary Examiner* — Namitha Pillai
(74) *Attorney, Agent, or Firm* — Kevin Sullivan; Kate Drakos; Micky Minhas (57) ABSTRACT

A diagram having initial visual design elements can be displayed on a computer display. For example, the diagram may be a computer software architectural diagram. Changes can be made to the diagram to produce modified visual design elements. The changes can be tracked as they are made, to produce change tracking information. The change tracking information can be processed to automatically highlight at least a portion of the modified visual design elements in a display of the diagram. Processing the change tracking information can include filtering the change tracking information to provide different highlighting treatment to some of the modified visual design elements corresponding to information that is filtered out.

20 Claims, 8 Drawing Sheets

(56) References Cited

OTHER PUBLICATIONS

Westhuizen, et al., "Understanding and Propagating Architectural Changes", Retrieved at <<http://citeseerx.ist.psu.edu/viewdoc/download?doi=10.1.1.16.2740&rep=rep1&type=pdf>> In the proceedings of the Working IFIP Conference on Software Architecture Aug. 25-30, 2002, pp. 1-15.

Fortsch, et al., "Differencing and Merging of Software Diagrams: State of the Art and Challenges", Retrieved at <<http://citeseerx.ist.psu.edu/viewdoc/download?doi=10.1.1.87.7745&rep=rep1&type=pdf>> Jul. 22-25, 2007, pp. 10.

"Visual Studio 2010 CTP 2—A close encounter with Sequence Diagram", Retrieved at <<http://dotnet.org.za/willy/archive/2008/11/18/visual-studio-2010-ctp-2-a-close-encounter-with-sequence-diagram.aspx>> Nov. 18, 2008, pp. 1-10.

"How to: Edit a UML Model and Diagrams", Retrieved at <<http://msdn.microsoft.com/en-us/library/dd409405(VS.100,printer).aspx >> Oct. 21, 2009, pp. 1-8.

"UML Sequence Diagrams: Reference", Retrieved at <<http://msdn.microsoft.com/en-us/library/dd409377(VS.100,printer).aspx >> Oct. 21, 2009, pp. 1-4.

* cited by examiner

HIGHLIGHTING CHANGES ON COMPUTER DIAGRAMS

BACKGROUND

The creation of computer diagrams (diagrams in computer systems that can be displayed, such as by displaying on a computer display or displaying by printing) is a common practice. Many different types of computer diagrams can be created and changed (building floor plans, business process flow diagrams, etc.). One example is software architectural diagrams (diagrams that represent aspects of the organizational structure and/or function of software, and may also represent aspects of associated hardware), which are commonly used in software development systems, such as Microsoft's Visual Studio® software development system. Software architectural diagrams may include various different diagrams, such as unified modeling language diagrams or other diagrams (e.g., class diagrams, component diagrams, composite structure diagrams, deployment diagrams, object diagrams, package diagrams, profile diagrams, activity diagrams, state machine diagrams, use case diagrams, communication diagrams, interaction overview diagrams, sequence diagrams, timing diagrams, layer diagrams, etc.).

Software architectural diagrams can be created in various ways, such as manual creation or drawing, generation from source code, and/or generation from tracing a running application. Some such diagrams may be created within a software development system, and others may be imported from other diagramming tools, such as Microsoft's Visio® diagramming software.

It is also common to change diagrams after they are created. For example, software architecture diagrams may be changed to outline software design changes. Often, these changes are subsequently reflected in the source code of the application. This may happen automatically or in response to detailed user input.

SUMMARY

The tools and techniques described herein relate to highlighting diagram changes on the diagram itself. Whatever the advantages of previous computer diagramming tools and techniques, they have neither recognized the diagramming tools and techniques described and claimed herein, nor the advantages produced by such tools and techniques.

In one embodiment, the tools and techniques can include displaying on a computer display a diagram having initial visual design elements. Changes can be made to the diagram to produce modified visual design elements. For example, the modified visual design elements may be added elements, modified versions of initial visual design elements, or even the space left by deleting initial visual design elements. The changes can be tracked as they are made, to produce change tracking information. The change tracking information can be one or more of a variety of different types of information obtained by tracking changes to the diagram. For example, the tracking information can include information that would allow changes to be undone or accepted by a user. The change tracking information can be processed to automatically highlight at least a portion of the modified visual design elements in a display of the diagram. Highlighting refers to giving modified visual design elements different visual properties than the same type of visual design elements would have if they were not modified. However, highlighting can take many different forms, such as the examples of highlighting discussed below.

In another embodiment of the tools and techniques, a baseline diagram having initial visual design elements can be generated. A modified diagram can be generated, such as by directly modifying the baseline diagram or by generating a new diagram with changes from the baseline diagram. The modified diagram can have modified visual design elements. Representations of a set of changes between the baseline diagram and the modified diagram can be captured. These changes may be changes made directly to the baseline diagram (such as changes requested directly by user input, where the changes are made to generate the modified diagram), or indirectly between diagrams (such as where a software architectural diagram (the baseline diagram) is generated from computer code, the computer code changes, and another software architectural diagram (the modified diagram) is generated from the modified computer code to visualize changes in the computer code). A first subset of the changes can be filtered out. As used herein, filtering refers to selecting one or more changes for particular highlighting treatment (such as highlighting in less conspicuous way, not highlighting at all, highlighting only at a group level rather than an individual level, etc.). The modified diagram can be displayed with the modified visual design elements. Displaying the modified diagram can include automatically highlighting a second subset of the one or more changes that does not include the first subset (i.e., highlighting changes that were not filtered out).

In yet another embodiment of the tools and techniques, a computer software architectural diagram can be displayed on a computer display. The diagram can have initial visual design elements, which can represent features of computer software code. In response to receiving user input, the following can be performed: making changes to the diagram to produce modified visual design elements; tracking the changes as they are made to produce change tracking information; and processing the change tracking information to automatically highlight at least a portion of the changes in a display of the diagram. Processing the change tracking information can include filtering the change tracking information.

In yet another embodiment of the tools and techniques, a baseline diagram can be generated from initial computer code. Changes can be made to the initial computer code to produce modified computer code, and a modified diagram can be generated from the modified computer code. The modified diagram can be displayed, including automatically highlighting at least a portion of the changes between the baseline diagram and the modified diagram, where the changes between the baseline diagram and the modified diagram can represent the changes to the initial computer code.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for improved computer diagram editing, where changes can be highlighted on the diagram itself. Such improvements may result from the use of various techniques and tools separately or in combination.

Such techniques and tools may include tracking changes made to a computer diagram. The information resulting from such tracking can be used to highlight the changes on the diagram itself. For example, if a diagram feature has been modified, the feature may be changed to a different color, line weight, and/or line style from other features in the diagram. Many other types of highlighting can be used instead of or in addition to these types of highlighting.

The information representing diagram changes may be filtered, so that the changes can be highlighted more clearly on a diagram. For example, such filtering can filter out insignificant changes to the diagram and not highlight the insignificant changes. As another example, such filtering may highlight more significant changes in a different way from less significant changes. As yet another example, a group of related changes may be filtered to highlight less than all the affected diagram features (e.g., only one diagram feature may be highlighted to represent changes to an entire group of features). However, this filtering may be reverted so that all the changes can be undone (at least if the changes have not yet been accepted by a user), including the representative highlighted change(s) and the represented changes that may not be highlighted.

Accordingly, the tools and techniques described herein can allow computer diagram changes to be effectively communicated on the computer diagram itself. For example, this may be useful to communicate design changes from a base diagram to an entire team of designers. As another example, a base diagram can be sent to an entire team of designers, and each team member's changes can be highlighted when the changed diagrams are sent back to the diagram author. As yet another example, a single user may be able to view changes made by that user, and make those same changes to some other object (e.g., software code) that is represented by the diagram.

However, the subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various procedures described herein may be implemented with hardware or software, or a combination of both. Moreover, for the sake of simplicity, flowcharts may not show the various ways in which particular techniques can be used in conjunction with other techniques.

I. Exemplary Computing Environment

Figure 1:
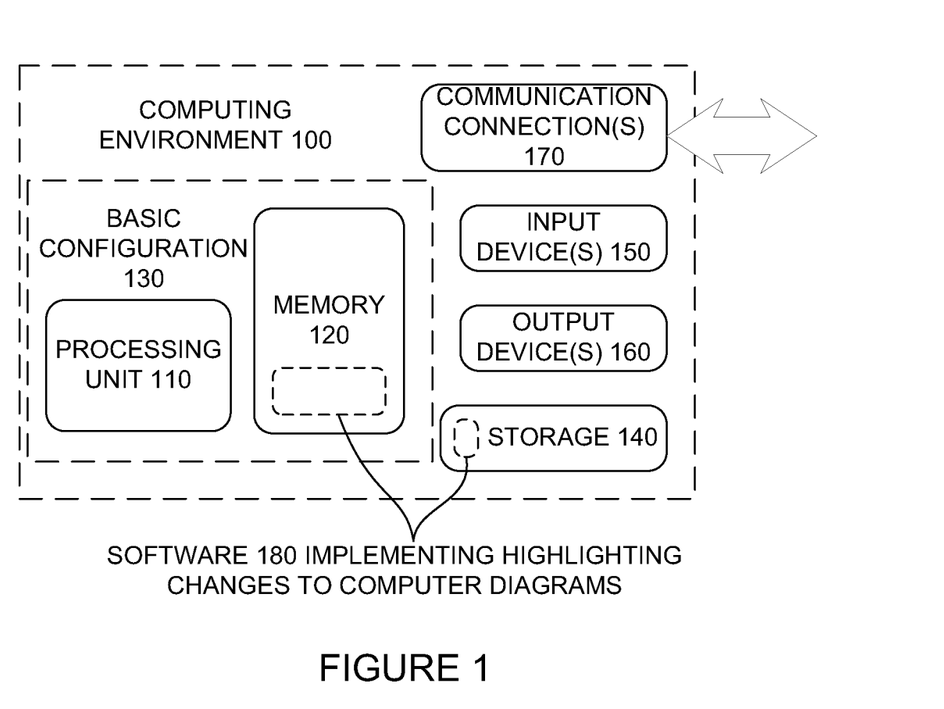
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as a computing environment for highlighting changes to computer diagrams. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing highlighting changes to computer diagrams.

Although the various blocks of FIG. 1 are shown with lines for the sake of clarity, in reality, delineating various components is not so clear and, metaphorically, the lines of FIG. 1 and the other figures discussed below would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Computer Diagram Change Highlighting System and Environment

Figure 2:
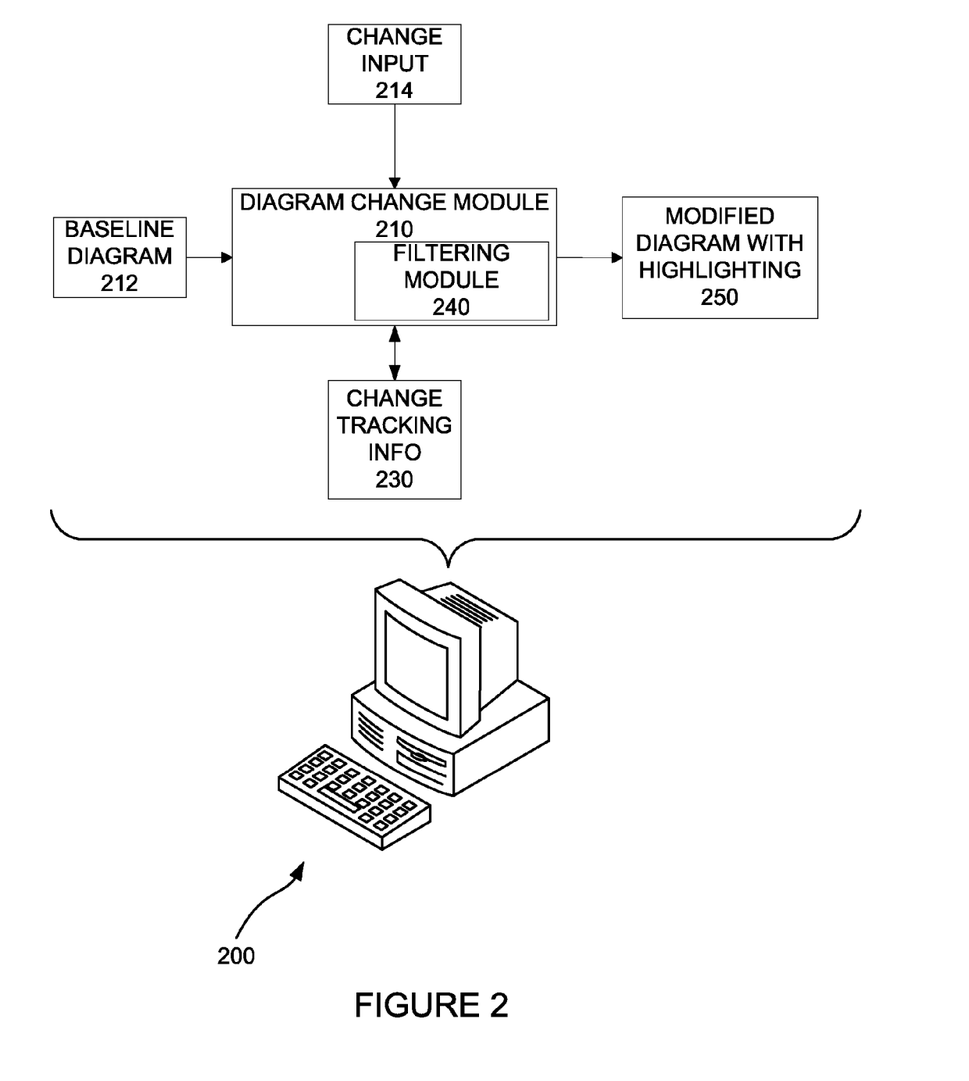
FIG. 2 is a block diagram of a computer diagram change highlighting environment.

FIG. 2 is a block diagram of a computer diagram change highlighting environment (200) in conjunction with which one or more of the described embodiments may be implemented. The change highlighting environment (200) can include a diagram change module (210), which can receive a baseline diagram (212) and input (214) indicating one or more changes to be made to the baseline diagram (212). The diagram change module (210) can make the indicated change(s) to the baseline diagram (212), and can also maintain change tracking information (230) that represents the change(s). The diagram change module (210) can process the change tracking information (230), such as by passing the change tracking information through a filtering module (240). Using the change tracking information (230) as processed by the filtering module (240), the diagram change module can highlight at least a portion of the change(s) in the baseline diagram (212) to highlight changes in a modified diagram (250). The modified diagram (250) can include the diagram change(s), and the modified diagram (250) may be further modified to add highlighting. For example, the highlighting may be added by altering properties of visual design elements of the modified diagram (250). Alternatively, change(s) between the baseline diagram (212) and the modified diagram (250) can be highlighted without further modifying the diagram itself. For example, the highlighting may be done using overlays, such as opaque or semi-transparent overlays displayed on top of the modified diagram (250). Thus, displaying the modified diagram (250) can include highlighting one or more changes in the modified diagram (250) by adding overlays on top of the modified diagram (250) in the display.

The change tracking information (230) may be stored, and it may also be used for techniques other than change highlighting. For example, for software architectural diagrams, the change tracking information (230) may be used to generate and/or modify computer code that is represented by one or more diagrams. As another example, the change tracking information (230) may be used to generate a work list or a set of work items to be performed. For example, these work items may represent tasks to be performed by software developers in implementing change represented by the change tracking information (230).

As just one example, the baseline diagram (212) may be a diagram that is represented in XML-formatted data in a diagram file. Of course many other alternative diagram formats could be used. In this XML-formatted data example, the XML data can be modified to make the indicated changes to the baseline diagram (212) according to standard practices. The XML data can also be modified to include the change tracking information (230), such as by including additional or modified properties on objects or fields in the XML data. The modified XML data can then be processed to display the modified diagram (250) with highlighting. Other ways of storing and/or maintaining the change tracking information (230) may be used. For example, a separate database may be used to store the change tracking information (230). The filtering module (240) can include a set of rules regarding the significance of changes and/or regarding the way that changes are to be highlighted. Those may be applied in different ways. In the example using XML data, the rules may be applied before changes are made to the XML data and/or when processing the changes that have been made to the XML data to display the modified diagram (250) with highlighting.

As noted above, the filtering module (240) can filter the change tracking information (230) before and/or after the change tracking information (230) is stored. This can be done to highlight the changes being made without making the resulting modified diagram (250) too busy or cluttered. For example, when changes are made to a group of visual elements on a diagram, it may be useful to highlight only one of them (only the item whose change initiated the other cascading changes, only a border for the group, etc.). For example, in software architectural diagrams highlighting may not be done for the closure of elements associated with the element that was actually changed (e.g., if a particular message is changed, all the messages contained in its closure may also change, but those other messages may not be highlighted). Additionally, insignificant changes may be filtered out and not be highlighted or be highlighted in less conspicuous ways. A set of filtering rules, such as the examples provided in the tables below, can define whether changes are significant.

A user may still make manual changes that override highlighting. For example, if a user manually changes the color of an item that would otherwise be changed to a highlighting color, the highlighting color change may be ignored. This may be done to respect the user's choice for color change. However, in such a situation, other types of highlighting may be used. For example, line thickness changes may still be made to highlight changes.

If a user makes a gesture to undo a change in the modified diagram (250), the diagram change module (210) can undo the change, and can undo highlighting for that change as well. Similarly, a user may accept a single change or group of changes. In response, the highlighting in the modified diagram (250) associated with the accepted change can be removed, and the change to the modified diagram (250) can remain. Similarly, a user may accept all changes to the modified diagram (250) to produce a new baseline diagram with no highlighting. Change tracking may remain active after changes are accepted, so that accepting all changes to the modified diagram (250) can denote that the modified diagram (250) is to be used as a new baseline with changes being tracked from that point forward.

A user may also make a gesture to provide input indicating that change tracking is to be turned on or off. This can result in some changes being tracked when change tracking is on, and others not being tracked when change tracking is off.

III. Example of a Software Architectural Sequence Diagram with Change Highlighting An example of change highlighting for a software architectural sequence diagram will now be described. For example, the sequence diagram may be a sequence diagram in a software development system such as Microsoft's Visual Studio® development system, and the development system may include a diagram change module that can track and highlight changes. It should be understood that the description herein is not limited to a sequence diagram or even software architectural diagrams in general. Moreover, the description is not limited to the particular types of filtering and/or highlighting described in this example. Rather, a software architectural sequence diagram is provided herein as an example of just one implementation of some tools and techniques described herein.

Figure 3:
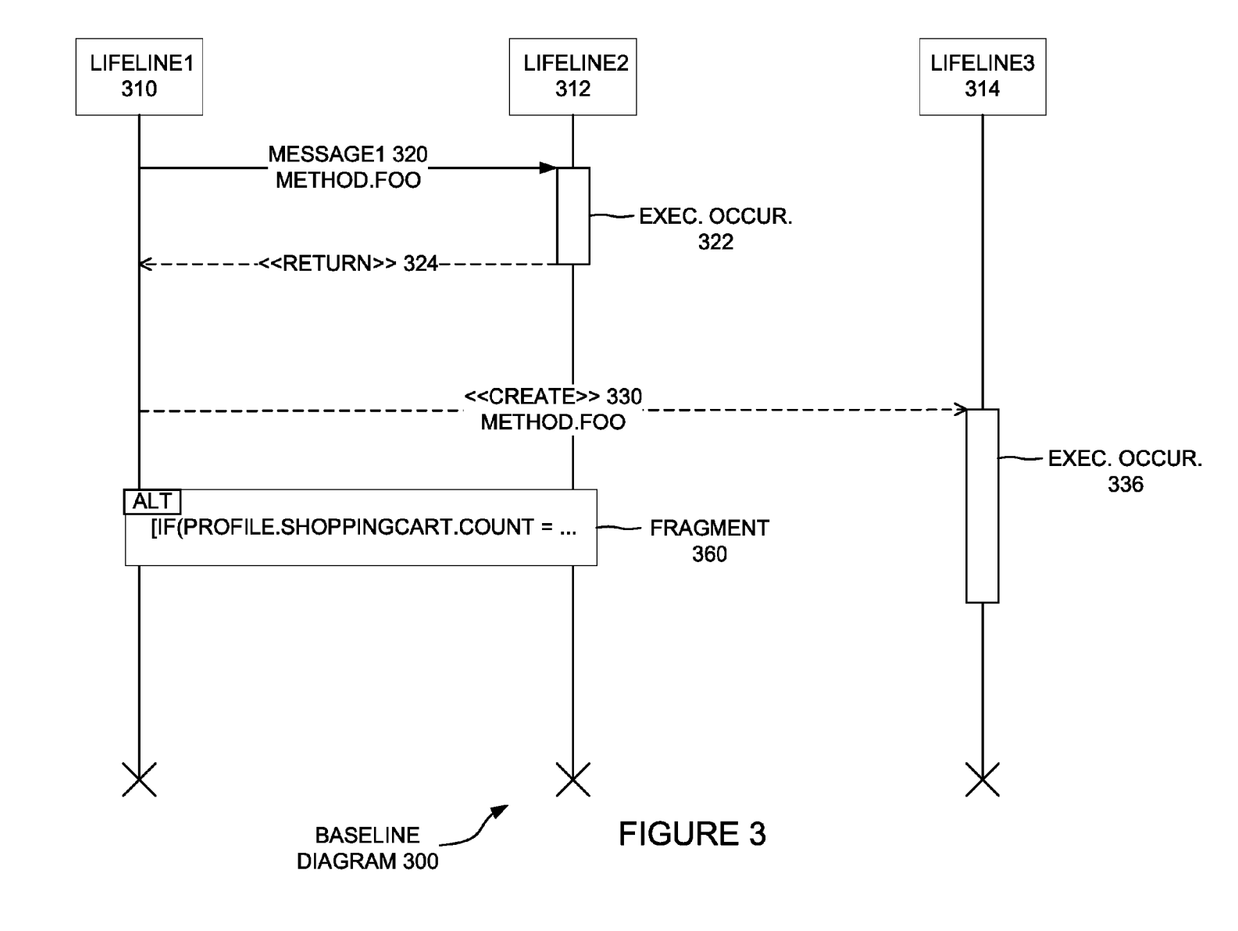
FIG. 3 is an illustration of a baseline sequence diagram.

FIG. 3 illustrates a baseline sequence diagram (300). The diagram includes three lifelines: lifeline 1 (310), lifeline 2 (312), and lifeline 3 (314). As is standard practice for sequence diagrams, each lifeline (310, 312, and 314) can include a head (rectangular box in FIG. 3) and a lifeline extending down from the head, with items farther down the lifeline being represented as later in time. Lifelines commonly represent different processes, different computing environments, etc. Messages between the lifelines can be illustrated by arrows extending horizontally from one lifeline to another, and execution instances within the lifelines can be illustrated by rectangles extending down along the respective lifelines. Additionally, fragments can be illustrated by rectangular boxes positioned over portions of one or more lifelines.

The baseline sequence diagram (300) includes message 1 (320) from lifeline 1 (310) to lifeline 2 (312) near the tops of the lifelines. An execution occurrence (322) can be illustrated as a rectangle over lifeline 2 (312), extending down from the end of the arrow for message 1 (320). At the bottom of the execution occurrence (322), a return message (324) can extend back from lifeline 2 (312) to lifeline 1 (310). Farther down lifeline 1 (310), a create message (330) can extend from lifeline 1 (310) to lifeline 3 (314), and an execution occurrence (336) can extend down from an end of the create message (330) on lifeline 3 (314). Additionally, an alt-type fragment (360) can extend between lifeline 1 (310) and lifeline 2 (312) below the create message (330) and to the left of the execution occurrence (336). The fragment (360) can begin with a guard, such as a guard that begins "if(profile.shopping-cart.count =".

The baseline sequence diagram (300) can be changed, and some of the changes may affect the underlying code of software represented by the baseline diagram (300), while other changes may not affect the underlying code. The following table lists some representations of types of changes that could be made to such diagrams, as well as a representation of an example of filtering rules that can be applied to information from such changes.

| Type of Change | Significant Change/ Change Can Affect Code? | Automatic Highlight? |
|---|---|---|
| Create new lifeline | Yes | Yes |
| Create new message | Yes | Yes |
| Create new fragment | Yes | Yes |
| Copy/paste | Yes | Yes |
| Rename a lifeline | Yes | Yes |
| Rename a message | Yes | Yes |
| Change the type of fragment | Yes | Yes |
| Change the guard text for an operand | Yes | Yes |
| Reorder lifelines | No | No |
| Reorder messages | Yes | Yes |
| Move lifelines/messages | No | No |
| Move lifelines/messages | No | No |
| Move to diagram | No | No |
| Collapse lifelines | No | No |
| Delete | Yes | No |
| Layout | No | No |
| Change lifeline actor | No | No |
| Change lifeline name | Yes | Yes |
| Change lifeline type | Yes | Yes |
| Change lifeline color | No | No |
| Change lifeline description | No | No |
| Change message name | Yes | Yes |
| Change message properties other than name | No | No |
| Change fragment operator | Yes | Yes |
| Change fragment name | Yes | Yes |
| Change operand guard | Yes | Yes |
| Change operand name | Yes | Yes |
| Change execution occurrence name | Yes | Yes |

In this example, changes are considered significant if they can affect the underlying software code, and insignificant changes (those that cannot affect the underlying software code) are not highlighted. However, some significant changes may not be highlighted. For example, deletions are significant (can affect code), but they are not highlighted because highlighting of such deletions may be deemed to create too much clutter in modified diagrams. Other filtering rules could be used for sequence diagrams. Moreover, different filtering rules can be used for other types of software architectural diagrams, and for other diagrams other than software architectural diagrams. For example, other criteria for determining significance could be used. For example, in diagrams that represent user interface features, significance may be based on distance, the amount of area that is affected by a change, or some other criteria. Also, filtering rules may be modifiable by users. Moreover, as noted above, filtering may include filtering out some changes to highlight a group of changes in a simpler way.

The following table illustrates some examples of how un-highlighted features may differ from highlighted features in a modified sequence diagram.

| Item | Un-Highlighted | Highlighted |
|---|---|---|
| Lifeline | Head outline = blue<br>Head fill = blue<br>Lifeline = solid line<br>All line thicknesses = default | Head outline = green<br>Head fill = white<br>Lifeline = segmented<br>All line thicknesses = default |
| Message | Message line color = grey<br>Line thickness = default | Message line color = yellow<br>Line thickness = bold/thicker |
| Execution Occurrence | Outline color = blue<br>Fill = blue<br>Outline thickness = default | Outline color = green<br>Fill = white<br>Outline thickness = default |
| Fragment | Outline color = black<br>Fill = none<br>Outline thickness = default | Outline color = green<br>Fill = none<br>Outline thickness = bold/thicker |

Many different types of highlighting could be used by changing colors, line thicknesses, fill types, etc. For example, because color differences are not shown in FIG. 4, an illustrated modified sequence diagram (400) (which was modified from the baseline sequence diagram (300) in FIG. 3, and includes the same reference numbers for the same features) in that figure includes the following features for un-highlighted and highlighted changes.

Figure 4:
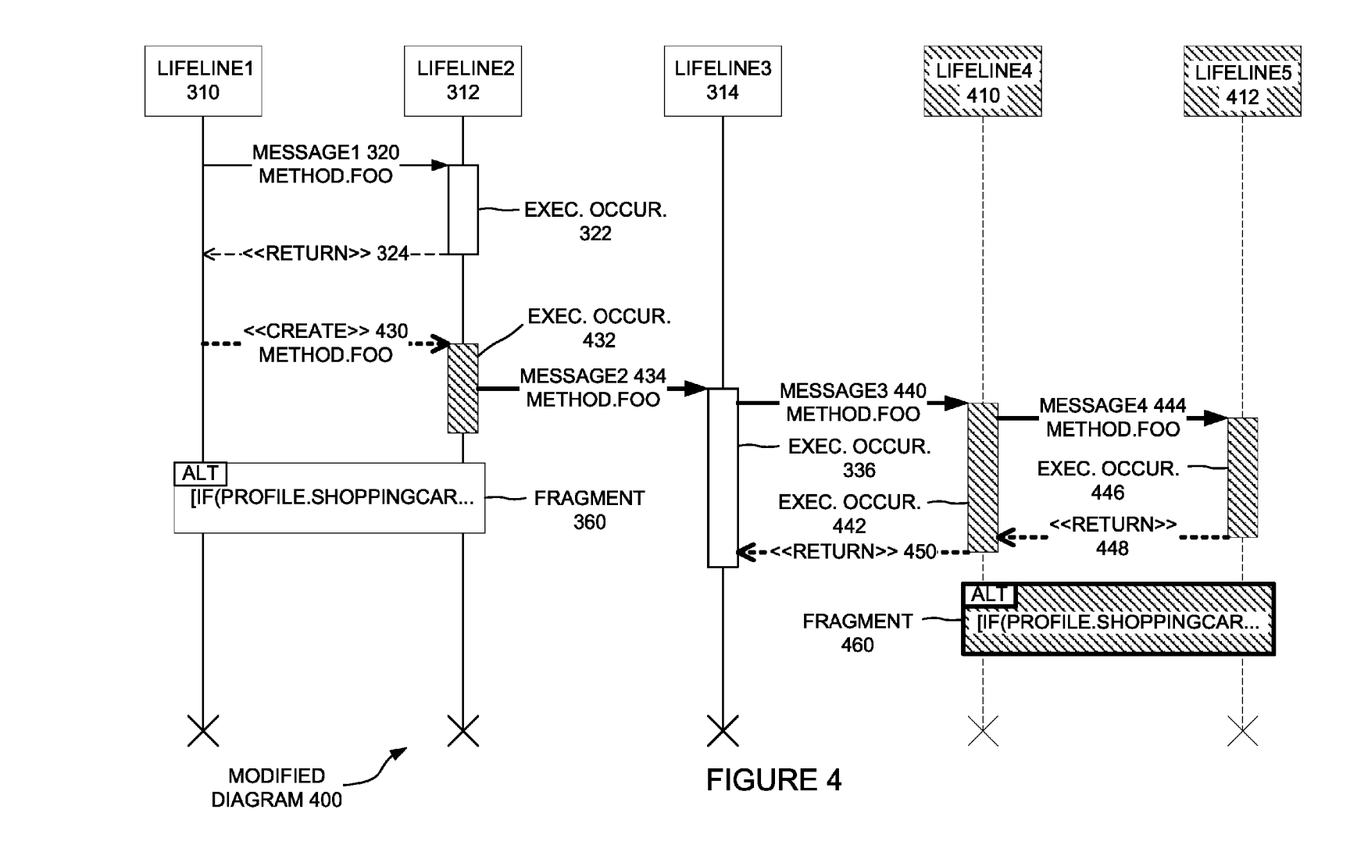
FIG. 4 is an illustration of a modified sequence diagram, based on the baseline sequence diagram of FIG. 3.

| Item | Un-Highlighted | Highlighted |
|---|---|---|
| Lifeline | Head outline = black<br>Head fill = white<br>Lifeline = solid line<br>All line thicknesses = default | Head outline = black<br>Head fill = black & white cross-hatched<br>Lifeline = segmented<br>All line thicknesses = default |
| Message | Message line color = black<br>Line thickness = default | Message line color = black<br>Line thickness = bold/thicker |
| Execution Occurrence | Outline color = black<br>Fill = white<br>Outline thickness = default | Outline color = black<br>Fill = black & white cross-hatched<br>Outline thickness = default |
| Fragment | Outline color = black<br>Fill = white<br>Outline thickness = default | Outline color = black<br>Fill = black & white cross-hatched<br>Outline thickness = bold/thicker |

Referring still to FIG. 4, in the modified diagram (400), lifeline 1 (310), lifeline 2 (312), and lifeline 3 (314) have all been moved, but the moves were not significant (as noted in the significance rules above), so these lifelines (310, 312, and 314) have not been highlighted. However, lifeline 4 (410) and lifeline 5 (412) have been added, and are highlighted. In addition, the create message (330) from FIG. 3 has been deleted (the deletion is not highlighted), and a new create message (430) has been added, and is highlighted (alternatively, the original create message (330) may have been changed to point to lifeline 2 (312)). The create message (430) is below the return message (324), and it extends from lifeline 1 (310) to lifeline 2 (312). An execution occurrence (432), which has been added and extends down lifeline 2 (312) from the create message (430), can be highlighted. Additionally, an added message 2 (434), which extends from the execution occurrence (432) on lifeline 2 (312), can be highlighted. Message 2 (434) can extend to the top of the existing execution occurrence (336) (which is not highlighted) on lifeline 3 (314). An added message, message 3 (440), can extend from the execution occurrence (336) to the top of an added execution occurrence (442) on lifeline 4 (410). Message 3 (440) and the added execution occurrence (442) can both be highlighted. Another added message, message 4 (444), can extend from the execution occurrence (442) to the top of another added execution occurrence (446) on lifeline 5 (412). Message 4 (444) and the added execution occurrence (446) can both be highlighted. An added return message (448) can extend from the bottom of the execution occurrence (446) on lifeline 5 (412) to the execution occurrence (442) on lifeline 4 (410). Another added return message (450) can extend from the bottom of the execution occurrence (442) on lifeline 4 (410) to the execution occurrence (336) on lifeline 3 (314). Both of these added return messages (448 and 450) can be highlighted. Alternatively, highlighting of the return messages (448 and 450) could omitted if the return messages (448 and 450) are simple returns of message 3 (440) and message 4 (444), included for closure. In addition, on the modified diagram (400), an additional fragment (460) has been added between lifeline 4 (410) and lifeline 5 (412). That fragment can be highlighted, as illustrated.

If a user were to reject the highlighted changes in the modified diagram (400) of FIG. 4, the changes could be undone and the highlighting could be removed to revert back to the baseline sequence diagram (300) of FIG. 3. On the other hand, if a user were to accept the highlighted changes in the modified diagram (400), the highlighting could be removed, and the modified diagram (400) could remain the same in other respects.

IV. Computer Diagram Change Highlighting Techniques

Several computer diagram change highlighting techniques will now be discussed. Each of these techniques can be performed in a computing environment. For example, each technique may be performed in a computer system that includes at least one processor and a memory including instructions stored thereon that when executed by the at least one processor cause the at least one processor to perform the technique (a memory stores instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 5:
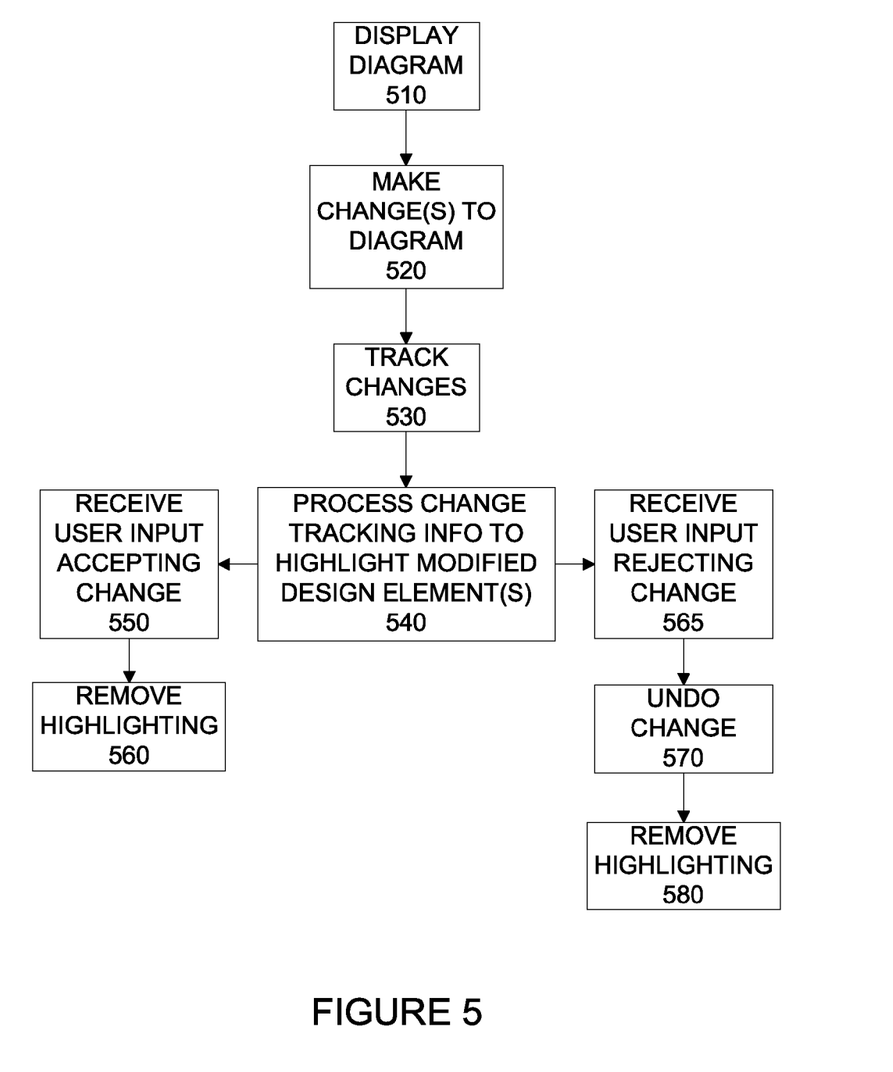
FIG. 5 is a flowchart illustrating a computer diagram change highlighting technique.

Referring to FIG. 5, a computer diagram change highlighting technique will be discussed. In the technique, a diagram having one or more initial visual design elements (for example, design elements such as the lifelines, messages, execution occurrences, and fragments of FIGS. 3-4, and/or other design elements such as other lines, shapes, etc.) can be displayed (510) on a computer display. Additionally, one or more changes can be made (520) to the diagram to produce one or more modified visual design elements. As the change(s) are made, the change(s) can be tracked (530) to produce change tracking information (such as a list of changes and/or fields associated with the data for the visual design elements). The change tracking information can be processed (540) to automatically highlight at least a portion of the one or more modified visual design elements in a display of the diagram.

The diagram can represent one or more features of computer code. For example, the diagram may be a software architectural diagram. Additionally, the initial visual design elements can be automatically generated from the computer code.

Processing (540) the change tracking information can include filtering the information. For example, the filtering can include classifying the change(s) into multiple categories (for example, additions, modifications, moves, reordering, etc.), and processing the change tracking information can include highlighting one subset of the categories and not highlighting another subset of the categories. Filtering can be done based on a set of filtering rules, and filtering can be based on significance of the change(s), such as visual significance of the changes and/or the effects of the changes on something (e.g., computer code) represented by the diagram. Highlighting can include highlighting a visual design element to represent a group of multiple changes to a group of visual design elements.

Referring still to FIG. 5, the technique can further include receiving (550) user input accepting one or more changes. In response to receiving (550) the user input, highlighting can be removed (560) from the one or more modified visual design elements. Also, the technique of FIG. 5 can include receiving (565) user input rejecting one or more changes. In response to the user input, at least one of the change(s) can be undone (570), and highlighting associated with the undone change(s) can be removed (580).

Figure 6:
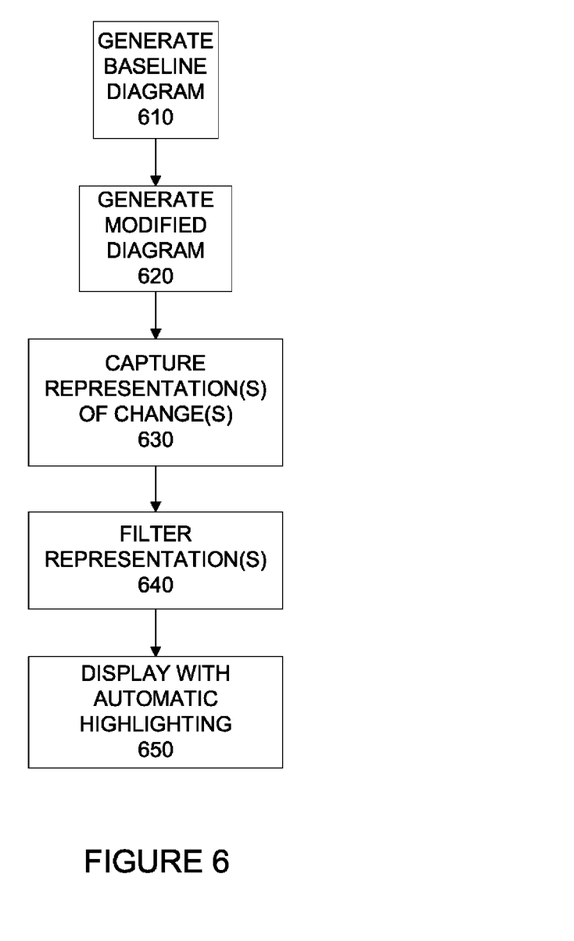
FIG. 6 is a flowchart illustrating another computer diagram change highlighting technique.

Referring to FIG. 6, another computer diagram change highlighting technique will be discussed. The technique can include generating (610) a baseline diagram having one or more visual design elements. A modified diagram can be generated (620), where the modified diagram can have modified visual design elements. One or more representations of a set of change(s) between the baseline diagram and the modified diagram can be captured (630), such as by tracking change(s) as they are made or by comparing representations of the baseline and modified diagrams. A first subset of the one or more changes can be filtered (640) out. Filtering (640) can include filtering based on significance of the change(s). The modified diagram can be displayed (650) with the one or more modified visual design elements. Displaying (650) the modified diagram can include automatically highlighting a second subset of the one or more changes that does not include the first subset.

Generating the baseline diagram can include generating the baseline diagram from initial computer code, and the technique can also include changing the initial computer code to produce modified computer code. Generating the modified diagram can include generating the modified diagram from the modified computer code. Also, the second subset of one or more changes between the baseline diagram and the modified diagram can represent one or more changes between the initial computer code and the modified computer code.

Displaying (650) may include displaying without highlighting the first subset of the one or more changes. Alternatively, displaying (650) may include highlighting the first subset of the one or more changes in a first way, and highlighting the second subset of the one or more changes in a second way. For example, the first subset of one or more changes may be highlighted with smaller line weights or with lighter colors than the second subset of one or more changes.

Figure 7:
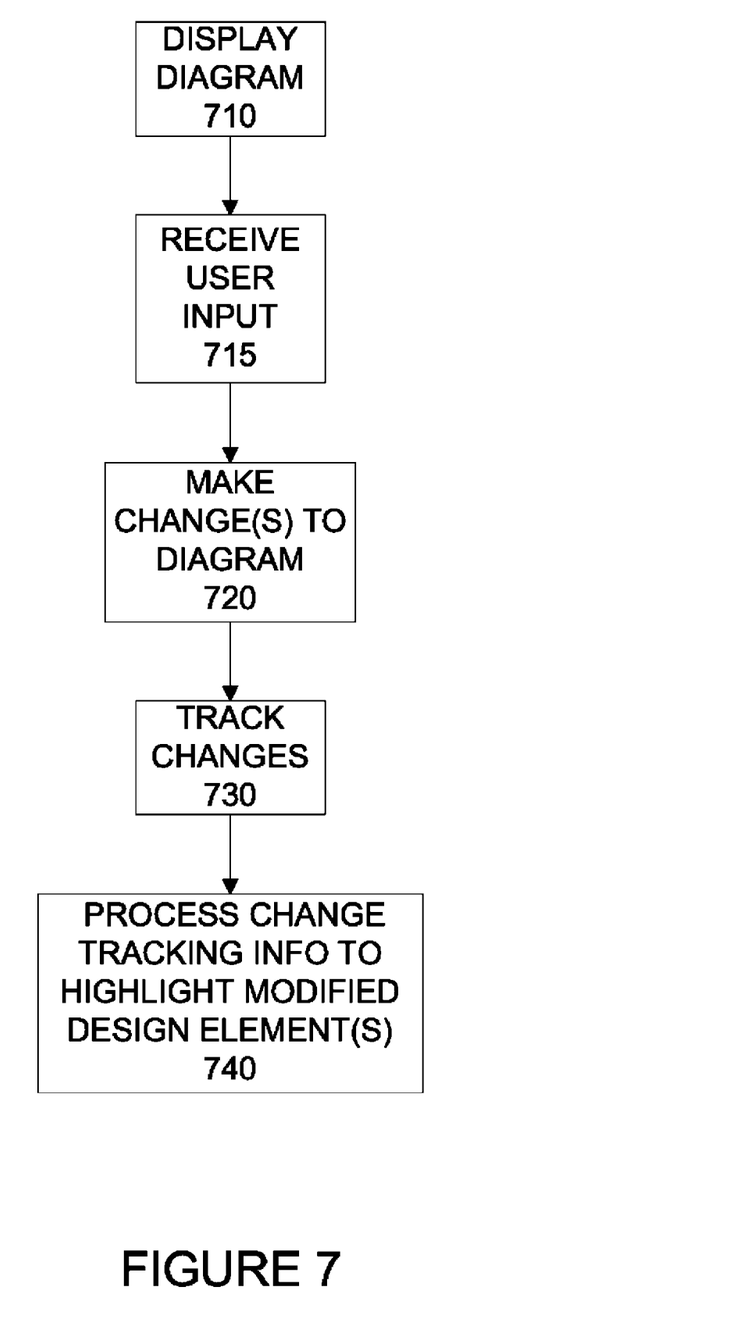
FIG. 7 is a flowchart illustrating yet another computer diagram change highlighting technique.

Referring to FIG. 7, another computer diagram change highlighting technique will be discussed. The technique can include displaying (710) a computer software architectural diagram on a computer display. The diagram can have one or more initial visual design elements representing one or more features of computer software code. In response to receiving (715) user input, the technique can include the following: making (720) one or more changes to the diagram to produce one or more modified visual design elements; tracking (730) the one or more changes as the one or more changes are made to produce change tracking information; and processing (740) the change tracking information to automatically highlight at least a portion of the changes in a display of the diagram. Processing (740) the information can include filtering the change tracking information.

Figure 8:
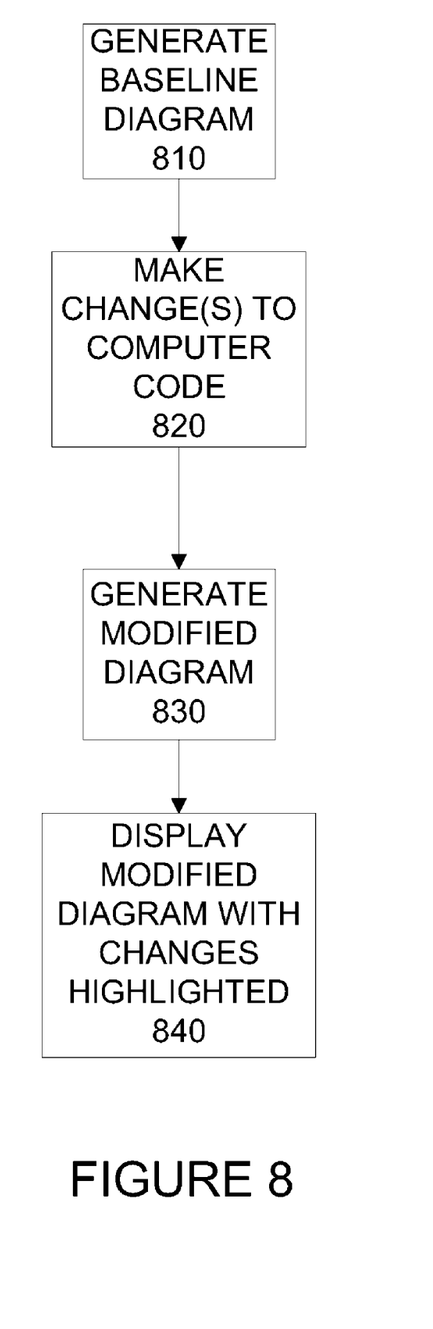
FIG. 8 is a flowchart illustrating yet another computer diagram change highlighting technique.

Referring to FIG. 8, another computer diagram change highlighting technique will be discussed. In the technique, a baseline diagram can be generated (810) from initial computer code. One or more changes can be made (820) to the initial computer code to produce modified computer code. A modified diagram can be generated (830) from the modified computer code. The modified diagram can be displayed (840), including automatically highlighting at least a portion of the one or more changes between the baseline diagram and the modified diagram can be highlighted, where the change(s) between the baseline diagram and the modified diagram can represent the change(s) to the initial computer code. In addition, the one or more changes between the baseline diagram and the modified diagram can be filtered.

Filtering can include identifying one or more of the change(s) to highlight, and automatically highlighting can include highlighting less than all of the change(s). Also, filtering can include identifying a first subset of one or more of the changes to highlight in a first way and identifying a second subset of one or more of the changes to highlight in a second way. Filtering can be done based on significance of the one or more changes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
    displaying on a computer display an initial version of a diagram having one or more initial visual design elements, the initial version of the diagram being defined by a set of initial diagram data;
    making multiple changes to the initial version of the diagram to produce a modified version of the diagram having one or more modified visual design elements, the modified version of the diagram being defined by a set of modified diagram data;
    tracking the multiple changes to produce change tracking information;
    storing the change tracking information, the stored change tracking information comprising additional information beyond the initial diagram data and the modified diagram data, and the stored change tracking information representing the multiple changes at one time; and
    processing the change tracking information to automatically highlight at least a portion of the one or more modified visual design elements in a display of the diagram, the processing of the change tracking information to automatically highlight the at least a portion of the one or more modified visual design elements comprising automatically filtering the change tracking information to filter out at least one of the changes to keep results of the at least one of the changes from being automatically highlighted in the display of the diagram, with at least one of the modified visual design elements resulting from the at least one of the changes being shown in the display of the diagram.

2. The method of claim 1, further comprising automatically generating the initial visual design elements from computer code.

3. The method of claim 1, wherein the filtering of the change tracking information comprises filtering based on a set of one or more filtering rules.

4. The method of claim 3, wherein the filtering comprising classifying the changes into multiple categories of changes specified in the filtering rules, and wherein processing the change tracking information to automatically highlight at least a portion of the one or more modified visual design elements comprises highlighting one subset of the categories and not highlighting another subset of the categories.

5. The method of claim 1, wherein the filtering of the change tracking information comprises filtering based on significance of the changes.

6. The method of claim 1, wherein highlighting comprises highlighting a visual design element to represent a group of multiple changes to a group of multiple visual design elements.

7. The method of claim 1, further comprising:
receiving user input; and
in response to the user input, removing highlighting from the one or more modified visual design elements.

8. The method of claim 1, further comprising:
receiving user input; and
in response to the user input, undoing at least one change of the changes and removing highlighting associated with the at least one change.

9. The method of claim 1, wherein:
the diagram is a computer software architectural diagram representing one or more architectural features of computer code;
processing the change tracking information comprises automatically filtering the change tracking information based on significance of the changes, the filtering comprising classifying the changes into multiple categories;
processing the change tracking information to automatically highlight at least a portion of the one or more modified visual design elements comprises highlighting one subset of the categories and not highlighting another subset of the categories;
highlighting comprises highlighting a visual design element to represent a group of multiple changes to a group of multiple visual design elements; and
the method further comprises receiving user input, and in response to the user input, removing highlighting from the one or more modified visual design elements.

10. The method of claim 1, wherein the tracking of the multiple changes to produce the change tracking information comprises tracking the multiple changes as the changes are made to produce the change tracking information as the changes are made.

11. A computer system comprising:
at least one processor; and
a memory comprising instructions stored thereon that when executed by the at least one processor cause the at least one processor to perform acts comprising:
displaying on a computer display an initial version of a diagram having one or more initial visual design elements, the initial version of the diagram being defined by a set of initial diagram data;
making multiple changes to the initial version of the diagram to produce a modified version of the diagram having one or more modified visual design elements, the modified version of the diagram being defined by a set of modified diagram data;
tracking the multiple changes to produce change tracking information;
storing the change tracking information, the stored change tracking information comprising additional information beyond the initial diagram data and the modified diagram data, and the stored change tracking information representing the multiple changes at one time; and
processing the change tracking information to automatically highlight at least a portion of the one or more modified visual design elements in a display of the diagram, the processing of the change tracking information to automatically highlight the at least a portion of the one or more modified visual design elements comprising automatically filtering the change tracking information to filter out at least one of the changes to keep results of the at least one of the changes from being automatically highlighted in the display of the diagram, with at least one of the modified visual design elements resulting from the at least one of the changes being shown in the display of the diagram.

12. The computer system of claim 11, wherein:
the filtering comprises identifying a first subset of one or more of the changes to highlight in a first way and identifying a second subset of one or more of the changes to highlight in a second way; and
highlighting comprises highlighting the first subset in the first way and highlighting the second subset in the second way.

13. The computer system of claim 11, wherein the acts further comprise automatically generating the initial visual design elements from computer code.

14. The computer system of claim 11, wherein the filtering of the change tracking information comprises filtering based on a set of one or more filtering rules.

15. The computer system of claim 14, wherein the filtering comprising classifying the changes into multiple categories of changes specified in the filtering rules, and wherein processing the change tracking information to automatically highlight at least a portion of the one or more modified visual design elements comprises highlighting one subset of the categories and not highlighting another subset of the categories.

16. The computer system of claim 11, wherein the filtering of the change tracking information comprises filtering based on significance of the changes.

17. The computer system of claim 11, wherein highlighting comprises highlighting a visual design element to represent a group of multiple changes to a group of multiple visual design elements.

18. The computer system of claim 11, wherein the acts further comprise:
receiving user input; and
in response to the user input, removing highlighting from the one or more modified visual design elements.

19. The computer system of claim 11, wherein the acts further comprise:
receiving user input; and
in response to the user input, undoing at least one change of the changes and removing highlighting associated with the at least one change.

20. One or more computer-readable storage media having computer-executable instructions embodied thereon that, when executed by at least one processor, cause the at least one processor to perform acts comprising:

displaying on a computer display an initial version of a diagram having one or more initial visual design elements, the initial version of the diagram being defined by a set of initial diagram data;

making multiple changes to the initial version of the diagram to produce a modified version of the diagram having one or more modified visual design elements, the modified version of the diagram being defined by a set of modified diagram data;

tracking the multiple changes to produce change tracking information;

storing the change tracking information, the stored change tracking information comprising additional information beyond the initial diagram data and the modified diagram data, and the stored change tracking information representing the multiple changes at one time; and processing the change tracking information to automatically highlight at least a portion of the one or more modified visual design elements in a display of the diagram, the processing of the change tracking information to automatically highlight the at least a portion of the one or more modified visual design elements comprising automatically filtering the change tracking information to filter out at least one of the changes to keep results of the at least one of the changes from being automatically highlighted in the display of the diagram, with at least one of the modified visual design elements resulting from the at least one of the changes being shown in the display of the diagram.

\* \* \* \* \*